UNITED STATES PATENT OFFICE.

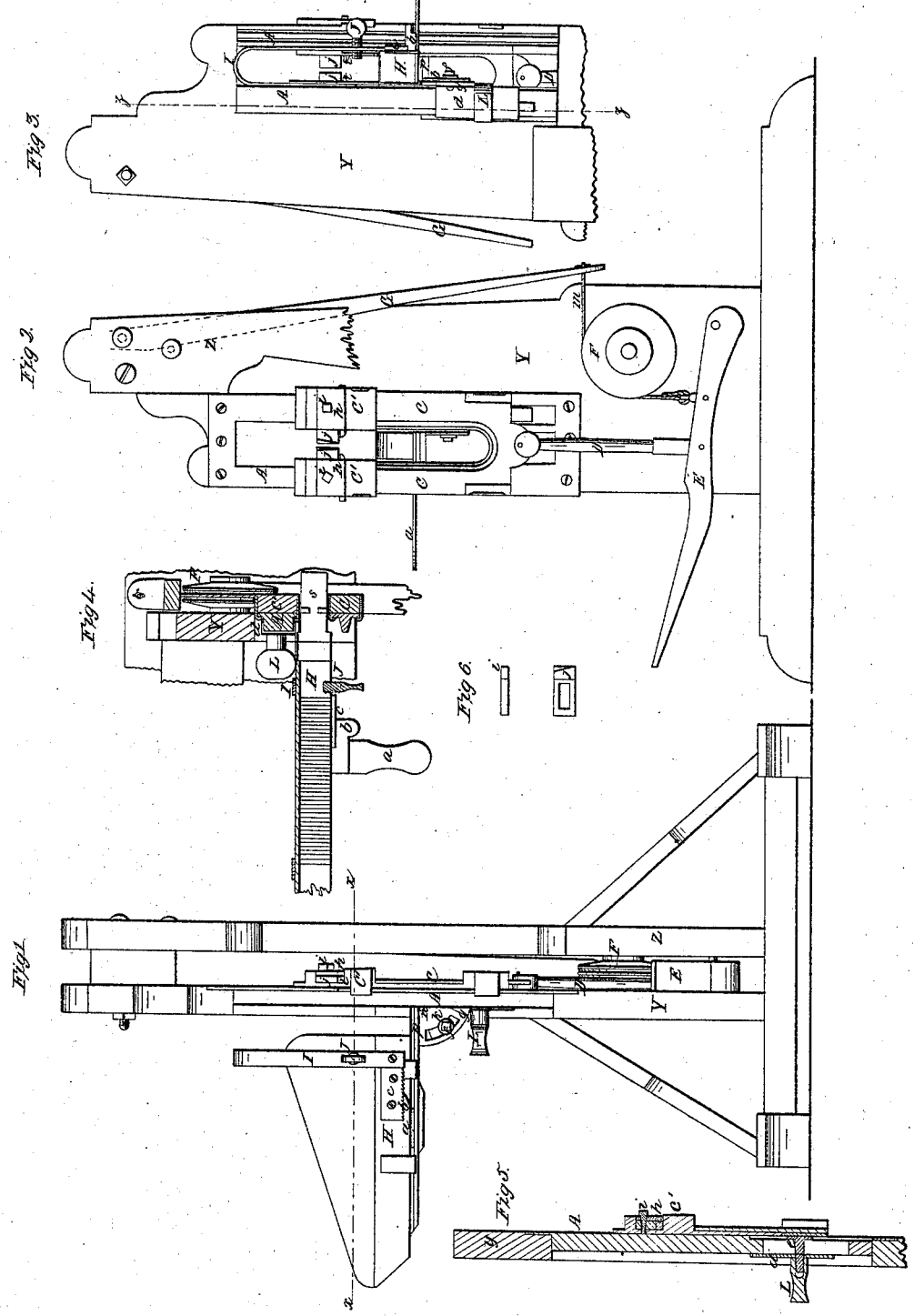

WILLIAM STEELE, OF WHEELING, VIRGINIA.

TENONING-MACHINE.

Specification of Letters Patent No. 12,449, dated February 27, 1855.

*To all whom it may concern:*

Be it known that I, WILLIAM STEELE, of Wheeling, in the county of Ohio and State of Virginia, have invented sundry new and useful Improvements in Tenoning-Machines; and I do hereby declare that the following is a full and exact description thereof, reference being had to the accompanying drawings, making a part of this specification.

The nature of my invention consists, first, in a gaged feeding box (H) combined with a metallic base ($p$) and rest ($s$) in such a manner that by the adjustment of said box, a tenon of any desired length may be measured upon the timber to be operated upon, and then the timber be fed up to the tenoning chisels by means of a ratchet handle ($a$) jointed to the said metallic base ($p$) and a ratchet ($c$) secured to the side of the said box (H).

The second feature of my invention, consists in the combination of the base $p$, of the feeding box H, and of the rest $s$, with one of the fender posts in such a manner that the said base and rest can be secured in an oblique position to the fender posts and to the movements of the tenoning cutters, whenever it may be desired to form tenons with oblique shoulders.

The third feature of my invention, consists in combining incision cutters with the tenoning cutters in such a manner that the incision cutters will penetrate into the surface of the wood and prevent the tenoning cutters, which follow them, from tearing off splinters from the sides of the timber operated upon.

The frame of my tenoning machine, is composed of the uprights Y, Z, which have their upper ends united to each other, and their lower ends secured in a suitable base. A rectangular metallic frame A, secured to the upright $y$, receives the gate C, in which the incision cutters $l, l$, and the tenoning cutters $j, j$, are secured; the sides of the said frame serving as fender-posts for the gate C, to play upon. Downward motion is imparted to the gate C, by means of the treadle E, and the pitman D; and upward motion is imparted to said gate, by the cord $m$, which is connected to the treadle E, and thence passes over the pulley F, to the spring bar G. Or the said gate may be operated by power in any usual or well-known manner.

The tenoning cutters $j, j$, and the incision cutters $l, l$, are secured in recesses in the enlargements C′, C′, at the upper end of the gate C, by means of the plates $h, h$, and the set screws $i, i$, as shown in Figures 2, and 5. The shape of the right angular cutting edges of the tenoning cutters is shown in Fig. 6. The end cutting edges of the tenoning cutters operate upon the sides of a tenon, and the side cutting edges of said cutters operate upon the shoulders of said tenons. The tenoning cutters are consequently so arranged that their end cutting edges will be separated from each other a distance exactly the same as that of the required thickness of the tenon to be formed. And the incision cutters $l, l$, are arranged in such positions that they will cut into the sides of the pieces of joist operated upon, a sufficient distance to prevent the action of the side cutting edges of the tenoning cutters from tearing splinters from the sides of said joist. The metallic base $p$, of the rest $s$, and of the gage box H, is secured to the frame A, in the following manner, viz: a sliding box $d$, having a wing $g$, secured to one of its sides, is connected to the innermost side of the said frame A, by means of a broad headed set screw $e$, that passes through a slot in the said side of A, and through the face of the box $d$, and that has a nut L, upon its outer end that bears against the face of $d$, by which the said box can be moved up or down and secured in any desired position upon the said side of A. The base $p$, of the gage box H, and of the rest $s$, has a segment shaped wing $k$, secured to its inner end, which wing is brought in contact with the wing $g$, of the box $d$, and secured thereto by means of the joint pin $n$, and the set screw $f$, as shown in Figs. 1 and 3. The said set screw $f$, passes through a curved slot in the wing $k$, and into a screw aperture in the wing $g$; and consequently, as the said wing $k$, is connected to the wing $g$, by a joint pin, the base $p$, (which is connected to $k$,) can be secured to the box $d$, in a position at right angles to the sides of the frame A, or in an oblique position thereto.

When a piece of joist is placed in the gage box H, to have a tenon formed upon one of its ends, the forward end of said poist is moved forward until it is brought in contact with the tenoning cutters, and then the gage box is moved outward from the rest $s$, a distance exactly equal to that of the required length of the tenon to be formed; the said joist is then secured in the box by the set screw J, and is fed forward to the cutters by means of reciprocating movements imparted to the hand lever a; the said lever being pivoted to the under side of the base p, and having a curved pawl b, rising from it and working into the teeth of the rack c, that is secured to the front side of the box H. The height of the base p, of the box H, and of the rest s, is adapted to the depth of the joist to be operated upon, so that there need not be an unnecessary amount of motion imparted to the tenoning chisels.

In the accompanying drawings Fig. 4, is a horizontal section in the line x, x of Fig. 1, and Fig. 5, is a vertical section in the line z, z, of Fig. 3.

What I claim as my invention and desire to secure by Letters Patent, is—

1. The arrangement of the feeding box H, the rest s, and their base p, with each other and with the gate C, which carries the tenoning cutters, in such a manner that the said feeding box may be moved from the said rest, upon the base p, the desired length of a tenon, and then be fed forward again, to bring the joist to be operated upon in contact with the cutters, substantially as herein set forth.

2. I also claim combining the base p, of the feeding box H, and of the rest s, with the frame A, in such a manner that the said base, box, and rest, can be secured in an oblique position to the sides of said frame, and to the direction of the movements of the tenoning cutters, whenever it may be desired to form tenons with oblique shoulders in the manner set forth, or its equivalent.

3. I also claim the combination of the incision cutters l, l, with the angular edged cutters j, j, in such a manner that the said incision cutters will penetrate into the surface of the wood, in advance of the tenoning cutters, a sufficient distance to prevent the said edges of the tenoning cutters from tearing out splinters from the sides of the timber operated upon.

The above specification of my improved tenoning machine signed and witnessed this twenty first day of November 1854.

WILLIAM STEELE.

Witnesses:
Z. C. ROBBINS,
G. W. ADAMS.